United States Patent [19]

Dietz et al.

[11] Patent Number: 4,905,766
[45] Date of Patent: Mar. 6, 1990

[54] ADAPTER FOR PLASTIC PIPE

[75] Inventors: William A. Dietz, Los Angeles; Rowland G. Hall, Burbank, both of Calif.

[73] Assignee: R&G Sloane Mfg. Co., Inc., Sun Valley, Calif.

[21] Appl. No.: 273,756

[22] Filed: Nov. 16, 1988

Related U.S. Application Data

[63] Continuation of Ser. No. 43,332, Apr. 28, 1987, abandoned.

[51] Int. Cl.$^4$ .................. A62C 39/00; A62C 37/08
[52] U.S. Cl. .................................. 169/91; 169/37; 169/5; 285/238; 285/330; 285/222; 285/382.4; 285/239; 285/915
[58] Field of Search ..................... 169/37–41, 169/90, 91, 5, 16; 285/238, 239, 222, 330, 382.4, 915

[56] References Cited

U.S. PATENT DOCUMENTS

| Re. 18,840 | 5/1933 | Eastman | 285/238 |
|---|---|---|---|
| 2,467,036 | 4/1949 | Iftiger, Sr. | 285/330 X |
| 2,776,151 | 1/1957 | Harkenrider | 285/238 X |
| 3,279,532 | 10/1966 | Pfeil, Jr. | 285/222 X |
| 3,807,776 | 4/1974 | Bingham | 285/238 X |
| 4,021,062 | 3/1977 | Mariaulle | 285/238 X |
| 4,076,280 | 2/1978 | Young | 285/382.4 X |
| 4,128,264 | 12/1978 | Oldford | 285/238 X |
| 4,341,481 | 7/1982 | Wollensak | 285/330 X |
| 4,606,783 | 8/1986 | Guest | 285/238 X |

Primary Examiner—Joseph F. Peters, Jr.
Assistant Examiner—James M. Kannofsky

[57] ABSTRACT

This invention relates to an adaptor for connecting a non-metallic pipe to a threaded metallic element, such as a sprinkler head, in leak-tight fluid communication. The adapter comprises a plastic coupling unit which is adhesively secured at one end to plastic pipe and adapted at the other end thereof to receive a threaded metal insert which may be threadably connected to a metal element, such as a sprinkler head. The adapter of the invention is particularly suitable for use in high pressure fire extinguishing systems.

10 Claims, 1 Drawing Sheet

ADAPTER FOR PLASTIC PIPE

This application is a continuation of application Ser. No. 043,332, filed Apr. 28, 1987, now abandoned.

BACKGROUND OF THE INVENTION

This invention relates to an adapter for connecting a threaded metal element to a plastic pipe in high pressure systems and particularly to an adapter for connecting a metal sprinkler head to plastic pipe in fire extinguishing sprinkler systems.

Conventional fire extinguishing systems generally comprise a network of piping for delivery of a fire extinguishant such as water to various locations throughout a building through sprinkler heads provided at the end of each pipe segment. The sprinkler heads are activated when the surrounding temperatures exceed an upper limit which causes a low melting point alloy in the sprinkler heads to melt.

Fire extinguishing systems utilizing plastic pipe are usually wet systems because water under high pressure (e.g., 200 psi or more) is maintained in the pipe to prevent heat damage thereto. However, prior pipe systems were frequently subject to failure at the threaded connection between a plastic adapter which is adhesively secured at one end thereof to the plastic pipe and threadably connected to the metal sprinkler head at the other end. The plastic threads of the adapter were found to be subject to attack by the solvent adhesive used to secure the adapter to the end of the plastic pipe. Moreover, cracks in the plastic coupling were frequently encountered due to overtightening of the metal sprinkler head. Cross-threading was also a problem when installing the sprinkler head to the plastic adapter.

To avoid some of these problems, brass inserts with threads have been incorporated into the end of plastic adapters during the formation thereof. Additionally, metal collars have been mounted around the exterior of the plastic adapter in order to provide support and to minimize the cracking thereof when mounting the sprinkler head. While these modifications reduced somewhat the frequency of failures, they were very expensive and very inconvenient to employ in the manufacturing procedures, particularly with conventional injection molding procedures utilized to manufacture the plastic adapters.

What has been needed and heretofore unavailable is a simple, inexpensive adapter to connect plastic pipe to a threaded metal element, such as a sprinkler head, which maintains a sound, leak-proof connection under high pressure systems. The present invention satisfies that need.

SUMMARY OF THE INVENTION

The present invention is directed to an improved adapter for connecting a threaded metal element, such as a sprinkler nozzle, to a plastic pipe which is particularly suitable for use in high pressure systems, such as in fire extinguishing systems.

The adapter in accordance with the present invention comprises an open-ended tubular plastic coupling unit having a bore or interior passageway interconnecting the two ends thereof with an annular projection or bushing and a threaded metal insert at least partially disposed within the plastic coupling unit. The internal bushing within the internal passageway of the coupling guides and positions the male end of the metal insert within the coupling unit. The male end of the metal insert disposed within the coupling unit is enlarged to a diameter greater than the inner diameter of the annular projection or bushing within the passageway of the coupling unit to prevent the removal of the metal insert from the female end of the coupling unit.

In a preferred embodiment, the inner surface of the bushing is provided with a plurality of elongated teeth or serrations which are adapted to engage the elongated teeth or serrations provided on the exterior surface of the male end of the insert in order to prevent the relative axial rotation of the metal insert within the coupling unit when a metal sprinkler head or other metal element is threadably mounted to the adapter.

The open-ended, tubular plastic coupling unit is provided with a first free end which is adapted to be coupled in fluid communication with the end of a plastic pipe, such as by a suitable solvent adhesive, and a second female end adapted to receive the threaded metal insert. The male end of the threaded metal insert, which is inserted into the plastic coupling unit, is preferably cylindrically shaped and, after the insert is positioned within the passageway of the coupling unit, is flared outwardly, such as by roll forming, to thereby lock the metal insert within the plastic coupling unit to prevent axial movement of the insert toward the female end of the coupling unit. The female end of the coupling unit is provided with a stepped inner surface which interfits with the stepped interior surface of the male end of the insert to ensure that the insert is properly positioned within the coupling unit. The free end of the metal insert is provided with threads which allow connection to a threaded metal element, such as a sprinkler head. The threads may be interior or exterior depending upon the nature of the attached threaded element.

An elastomeric or rubber O-ring is disposed within a circumferential groove defined between the exterior surface of the metal insert and the interior surface of the plastic coupling unit to prevent fluid leakage therebetween.

To assemble the adapter, the metal insert is positioned within the bore of the coupling unit with the teeth or serrations properly aligned, the insert is pressed into the coupling body to intermesh the teeth or serrations, and then the inserted male end of the insert is roll formed so as to flare outwardly against the edge of the bushing axially distant from the female end of the coupling unit to lock the metal insert within the passageway of the coupling unit. A sprinkler head or other threaded element may then be threadably connected to the metallic threads of the insert. The threaded connection is metal-to-metal so there is little likelihood of cracking or other damage to the threads. Moreover, the solvent adhesive used to connect the adapter to the end of the plastic pipe will not have any significant effect on the metallic threads.

These and other advantages of the present invention will become more apparent from the following detailed description of the invention, when taken in conjunction with the exemplary drawings.

DETAILED DESCRIPTION OF THE INVENTION

Figure 1:
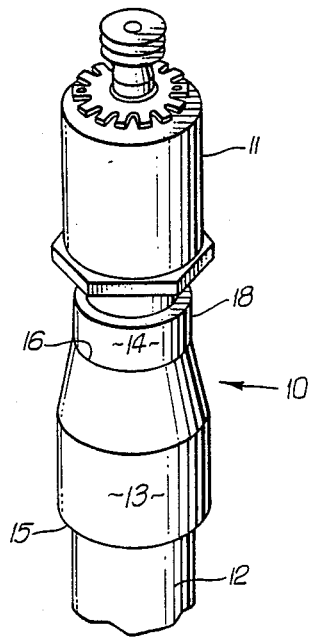
FIG. 1 is a perspective view, partially in section, of an adapter embodying features of the invention which connects a plastic pipe in fluid communication with a sprinkler head.

Reference is made to FIG. 1 which illustrates an adapter 10 embodying features of the invention for connecting a threaded metallic element, such as a sprinkler head 11, to a plastic pipe 12 which may be part of a high pressure, water-based fire extinguishing system.

Figure 2:
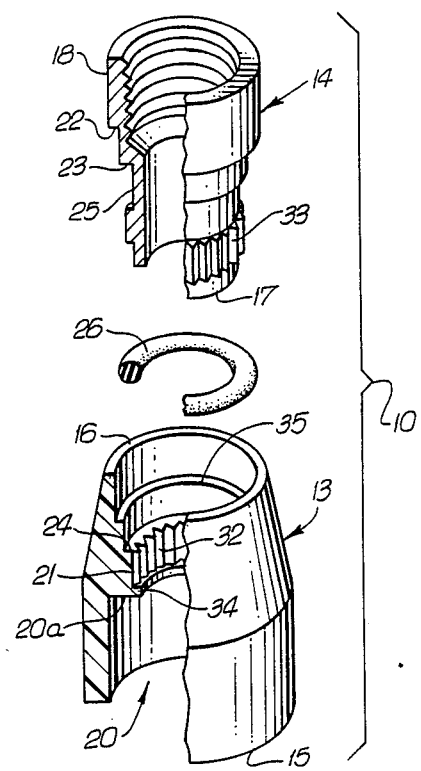
FIG. 2 is an exploded view, partially in section, of the adapter shown in FIG. 1.
Figure 3:
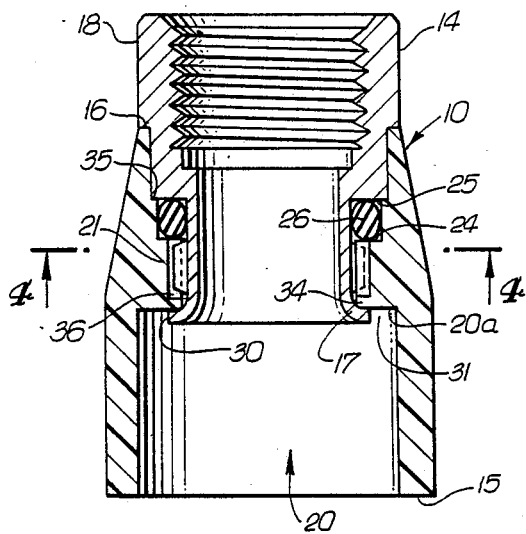
FIG. 3 is an elevational cross-sectional view of the adapter shown in FIG. 1.

With paticular reference to FIGS. 1 through 3, the adapter 10 of the invention generally comprises a nonmetallic coupling unit 13 and a metal insert 14 which is adapted to be inserted into one end of the coupling unit 13. The tubular shaped coupling unit 13 has a first free end 15 which is adapted to be connected by suitable means, such as solvent adhesive, to plastic pipe 12 and a second female end which terminates in a narrow end surface 16 which is adapted to receive the male end 17 of the tubular shaped metal insert 14. The metal insert 14 has a threaded free end 18 which is adapted to be threadably connected to a threaded metal element, such as a fire extinguishing sprinkler head 11, shown in FIG. 1.

As shown more clearly in FIGS. 2 and 3, the coupling unit 13 is provided with an internal bore or passageway 20 having an annular projection or bushing 21 to guide and position the male end 17 of the metal insert 14 during the insertion thereof. The male end 17 of the metal insert 14 which is disposed within the coupling unit 13, is enlarged after insertion to an outer diameter greater than the inner diameter of the interior annular projection or bushing 21 to prevent the withdrawal of the metal insert 14 from the female end 16 of the coupling unit 13.

The metal insert 14 generally has a stepped exterior surface which matches and interfits with the stepped inner surface of the coupling unit 13. A first external circumferential shoulder 22 on the metal insert 14 acts as a stop for the narrow end 16 of the coupling unit 13. A second circumferential shoulder 23 of the metal insert 14 acts as a stop for the first internal shoulder 35 on the coupling unit 13 and also defines in part, in conjunction with the end 24 of the annular projection or bushing 21 of the coupling unit 13 nearest the female end 16, a circumferential groove 25 in the second portion of the stepped internal passageway adapted to receive a suitable rubber or elastomeric O-ring 26 which prevents the passage of fluid between the coupling unit 13 and the metal insert 14.

Thus, as can best be seen in FIG. 2, the lower open end of the bore 20 opens upwardly past an internal annular shoulder 20a into the smaller, stepped internal passageway which extends to the opposite end 16 of the adapter, and this passageway has, in succession from the end 16 inwardly, a first portion 16a adjacent the end having a first internal shoulder 35 at its inner end; a second, smaller portion, indicated generally at 25, having a second internal shoulder 24 at the upper end of the bushing 21; and a third, still smaller portion between the second shoulder and the open lower end portion of the bore 20, this being the interior of the bushing 21, which herein is serrated, as will be described. Beyond the serrated bushing, the inner end of the passagway opens into the bore 20.

To facilitate insertion into the coupling unit 13, the male end 17 of the metal insert 14 is initially cylindrical in shape, as shown in FIG. 2, with an outer diameter less than the inner diameter of the inwardly projecting bushing 21 of the coupling unit. Once the insert 14 is properly positioned within the bore 20 of the coupling unit 13, the male end 17 thereof is flared outwardly preferably by roll forming to lock the insert against the annular shoulder 20a. As shown more clearly in FIG. 3, the outer edge 30 of the flared end 17 of the metal insert 14 forms a recess 31 at the shoulder 20a adjacent the distant end 24 of the inwardly projecting bushing 21 to capture excess solvent adhesive when the free end 15 of the coupling unit 13 is adhesively secured to the end of plastic pipe 12.

Figure 4:
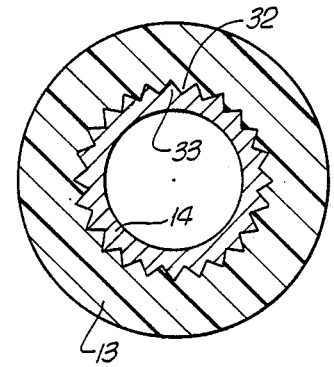
FIG. 4 is a cross-sectional view taken along the line 4—4 shown in FIG. 3.

The surface of the bushing 21 and the exterior surface of the male end 17 of the metal insert 14 are both provided with interfitting elongated teeth or serrations 32 and 33, respectively, which when engaged prevent rotation between the coupling unit 13 and the metal insert 14. In this manner, when a threaded metallic element, such as a sprinkler head 11, is threadably coupled to threaded end 18 of the insert 14 and tightened, the insert 14 will not rotate about its longitudinal axis. As shown in FIGS. 2 and 4, there are 36 individual elongated teeth or serrations around both the inner periphery of the bushing 21 and the exterior surface of the metal insert 14. However, the number of teeth or serrations can vary depending upon the diameter. The interfit of the triangular shaped teeth 32 and 33 are best shown in FIG. 4. A ridge 34 encircling the lower end of the bushing 21 forms an extension of the shoulder 20a and provides a radius to eliminate cracking of end 17 when flared in the coupling unit. When assembled, the triangular teeth 33 on metal insert 14 do not contact distant end 24 of bushing 21, leaving a small void 36 which acts as a collector for any plastic material that is sheared during assembly. This eliminates the need for chip removal.

If desired, other types of interfitting surfaces, such as knurled or even threaded surfaces, may be employed, although in the latter instance, relative rotational movement would be necessary to tighten the metal insert 14 within the coupling unit 13.

To assemble the adapter 10 of the present invention, an O-ring 26 is positioned within the annular groove 25 and then the male end 17 of the insert 14 is pressed into the female end 16 of the coupling unit 13 after proper alignment so that the elongated teeth 32 and 33 properly interfit. The insert 14 is pressed into the coupling unit 13 until end 16 of the coupling unit 13 engages the shoulder 22 provided on the exterior of the metal insert 14. The cylindrically shaped male end of the metal insert 14 is then flared outwardly so as to press against the distant end 24 of the bushing 21 and thereby lock the metal insert 14 within the coupling unit 13.

The coupling unit 13 may be formed in any suitable manner but preferably is injection molded from high impact resistant plastic materials, such as chlorinated polyvinyl chloride and polybutylene. Other materials, such as fiberglass, may also be used. The metal insert is preferably machined from brass stock to provide the threads and other detailed surface configurations. Other metals such as aluminum may also be used.

The adapter of the present invention provides a leak-tight connection between a non-metallic pipe and a threaded metal element at high fluid pressures over extended periods. There is little or no tendency for the adapter to crack during the mounting of the metal element or during use.

Although the adapter is described herein primarily in conjunction with a high pressure fire extinguishing system, other uses are contemplated. For example, the adapter can be used in high pressure agricultural irrigation systems. Moreover, various modifications and improvements can be made to the present invention without departing from the scope thereof.

What is claimed is:

1. An adapter for connecting a threaded metal element to a non-metallic pipe and providing a fluid-tight connection in a high-pressure system, comprising:
   a tubular plastic adapter unit having
   an open-ended bore at one end for telescoping with the non-metallic pipe, an internal annular shoulder facing toward the opening end of said bore, and a stepped internal passageway extending from said bore through the adapter unit to the opposite end thereof,
   said passageway comprising a first portion adjacent said opposite end having a first internal annular shoulder at its inner end spaced inwardly from said opposite end, a second portion smaller than said first portion having a second internal shoulder at its inner end, and a third portion smaller than said second portion between said second shoulder and said bore,
   and a ridge projecting inwardly from the wall of said passageway where said third portion meets said bore;
   and a tubular metal insert disposed in said passageway and having
   an internally threaded end portion fitted in said first portion of said passageway and having an external shoulder pressing against said first internal shoulder, an elongated cylindrical end portion extending through said second and third portions of said passageway to said ridge, and an outwardly flared end of said cylindrical portion within said bore curving around said ridge and pressing against the ridge to lock the insert within the adapter unit;
   an O-ring seal encircling said cylindrical end portion and positioned within said second portion of said passageway between said external shoulder and said second internal shoulder to form a fluid seal between said adapter unit and said insert;
   and interfitting longitudinal keying means on the wall of said passageway within said third portion and on said end portion for preventing relative rotational movement of said adapter unit and said insert.

2. An adapter as defined in claim 1 wherein the inner surface of said ridge is formed with a radius, and said outwardly flared end of said insert is a continuous surface formed and pressing against said radius to clamp said insert tightly into said adapter unit to provide a leak-tight connection.

3. An adapter as defined in claim 1 wherein said adapter unit is composed of high impact resistant plastic and said insert is composed of brass.

4. An adapter as defined in claim 1 wherein said keying means are closely interfitting longitudinal teeth around both the wall of said passageway and the exterior of said cylindrical end portion.

5. An adapter as defined in claim 1 wherein said opposite end portion of said adapter unit terminates in a narrow end surface, and said insert projects outwardly beyond said end surface and has an additional external shoulder abutting against the end surface.

6. An adapter for connecting a metal element to a non-metallic pipe, comprising:
   a tubular plastic adapter unit having an open-ended bore at one end for connection to the non-metallic pipe and an internal passageway extending from said bore through said adapter unit to the opposite end thereof, said passageway having an enlarged end portion and at least one internal shoulder facing away from said bore;
   and an inwardly projecting plastic ridge in said passageway at its junction with said bore having an inner surface formed with a radius;
   and a tubular metal insert disposed in said passageway and having an end portion fitted in said enlarged end portion, an external shoulder pressing against the internal shoulder in said passageway, an elongated cylindrical portion extending past said ridge to said bore, and a flared inner end curved outwardly around the radius on said ridge, said flared inner end pressing against said ridge to hold said shoulders tightly together.

7. An adapter as defined in claim 6 further including sealing means in said passageway between said external shoulder and said ridge.

8. An adapter as defined in claim 6 further including keying means acting between said cylindrical portion and said passageway to prevent relative rotation of the adapter unit and the insert.

9. An adapter for connecting a metal element to a non-metallic pipe, comprising:
   a tubular non-metallic adapter unit having an open-ended bore at one end for connection to the non-metallic pipe and an internal passageway having an inner end opening into said bore, and extending from said bore through said adapter unit to the opposite end thereof, said passageway having at least one internal shoulder facing toward said opposite end, and said bore being larger than said passageway to form a second shoulder around said inner end facing toward said one end;
   and a tubular metal insert disposed in said passageway and having an external shoulder pressing against said internal shoulder, an elongated cylindrical portion extending past said inner end of said passageway into said bore, and a flared inner end on said cylindrical portion curving outwardly into said recess and pressing against said adapter unit to draw said insert tightly into said adapter unit.

10. An adapter as defined in claim 9 wherein said passageway has a second internal shoulder around said cylindrical portion and spaced from said external shoulder, and further including seal means pressed between said external shoulder and said second internal shoulder and sealing said passageway.

* * * * *